United States Patent
Huang et al.

(10) Patent No.: US 11,970,116 B2
(45) Date of Patent: Apr. 30, 2024

(54) OPERATING METHOD OF OPTICAL SYSTEM IN VEHICLE

(71) Applicant: Innolux Corporation, Miao-Li County (TW)

(72) Inventors: Yu-Chia Huang, Miao-Li County (TW); Tsung-Han Tsai, Miao-Li County (TW); Kuan-Feng Lee, Miao-Li County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 17/741,470

(22) Filed: May 11, 2022

(65) Prior Publication Data
US 2022/0388449 A1    Dec. 8, 2022

(30) Foreign Application Priority Data
Jun. 2, 2021    (CN) .......................... 202110616425.5

(51) Int. Cl.
*B60R 1/22* (2022.01)
*B60R 1/29* (2022.01)

(52) U.S. Cl.
CPC .................. *B60R 1/22* (2022.01); *B60R 1/29* (2022.01); *B60R 2300/205* (2013.01)

(58) Field of Classification Search
CPC ....... B60R 1/22; B60R 1/29; B60R 2300/205; G02B 27/0101; G09G 3/3426; G09G 2320/0646; G09G 2380/10; B60K 2370/1529; B60K 2370/332; B60K 35/00; B60K 2370/343; B60K 2370/349; B60K 2370/52
See application file for complete search history.

(56) References Cited

U.S. PATENT DOCUMENTS

| | | | |
|---|---|---|---|
| 2010/0013866 A1 | 1/2010 | Okabe | |
| 2012/0154591 A1* | 6/2012 | Baur | H04N 7/183 348/148 |
| 2019/0025581 A1 | 1/2019 | Nambara | |
| 2020/0012098 A1 | 1/2020 | Irzyk | |
| 2020/0082185 A1* | 3/2020 | Yamamoto | G06V 20/58 |
| 2020/0152139 A1 | 5/2020 | Aoki et al. | |
| 2021/0043151 A1 | 2/2021 | Nawata et al. | |

FOREIGN PATENT DOCUMENTS

| | | |
|---|---|---|
| JP | 2001142409 | 5/2001 |
| WO | 2011021663 | 2/2011 |

OTHER PUBLICATIONS

"Search Report of Europe Counterpart Application", dated Oct. 18, 2022, p. 1-p. 7.

* cited by examiner

*Primary Examiner* — Farzana Hossain
(74) *Attorney, Agent, or Firm* — JCIPRNET

(57) ABSTRACT

An operating method of an optical system in a vehicle is provided. The optical system includes a display device. The display device includes a display panel and a plurality of light emitting units. The light emitting units are configured to emit a light to the display panel. The operating method includes the following steps. An emphasized portion of an object is determined. An image corresponding to the emphasized portion is displayed by the display device by adjusting a light intensity of at least a portion of the light emitted from the light emitting units.

12 Claims, 9 Drawing Sheets

OPERATING METHOD OF OPTICAL SYSTEM IN VEHICLE

CROSS-REFERENCE TO RELATED APPLICATION

This application claims the priority benefit of China application serial no. 202110616425.5, filed on Jun. 2, 2021. The entirety of the above-mentioned patent application is hereby incorporated by reference herein and made a part of this specification.

BACKGROUND

Technical Field

The disclosure relates to an operating method of an optical system, and more particularly, to an operating method of an optical system in a vehicle.

Description of Related Art

Drivers can integrate image information into actual traffic conditions through an optical system in a vehicle, thereby enhancing their perception of the driving environment. However, in some cases, an image displayed by the optical system in the vehicle may need to be adjusted to enhance the driving safety and provide good user experience. For example, a light leakage may occur in the image displayed while driving, causing the displayed information to be unclear. In addition, when an ambient object appears on the driving route, it may overlap with the displayed image, reducing the driving safety.

SUMMARY

According to some embodiments of the disclosure, in an optical system in a vehicle, a light intensity of at least a portion of the light emitted from the plurality of light emitting units in the display device can be adjusted according to information that is sensed, thereby enhancing the driving safety and providing good user experience.

According to an embodiment of the disclosure, an operating method of an optical system in a vehicle is provided. The optical system includes a display device. The display device includes a display panel and a plurality of light emitting units. The light emitting units are configured to emit a light to the display panel. The operating method includes the following steps. An emphasized portion of an object is determined. An image corresponding to the emphasized portion is displayed by the display device by adjusting a light intensity of at least a portion of the light emitted by the light emitting units.

In order for the disclosure to be more comprehensible, embodiments accompanied with drawings are described in detail below.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

Figure 1:
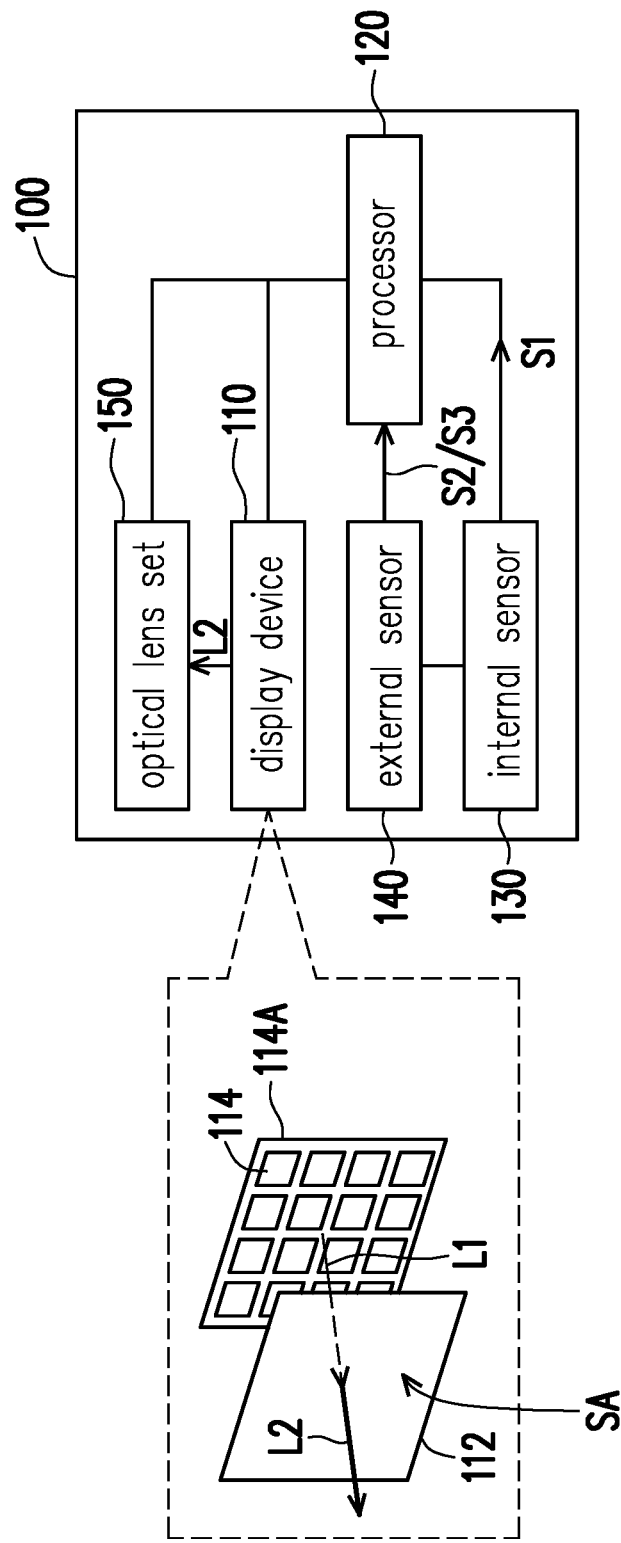
FIG. 1 is a schematic block diagram of an optical system in a vehicle according to an embodiment of the disclosure.

It should be understood that other embodiments may be utilized and structural changes may be made without departing from the scope of the disclosure. Likewise, it should be understood that wordings and terminologies used herein are for descriptive purposes, and should not be considered restrictive. The use of "comprising", "including" or "having", and their variations herein is intended to cover the items listed thereafter and the equivalents and additional items thereof. Unless otherwise limited, the terms "connected", "coupled", and their variations herein are used in a broad sense and encompass direct and indirect connections and couplings.

Reference will now be made in detail to the exemplary embodiments of the disclosure, and examples of the exemplary embodiments are illustrated in the accompanying drawings. Whenever possible, the same reference numerals are used in the drawings and descriptions to refer to the same or similar parts.

Figure 2:
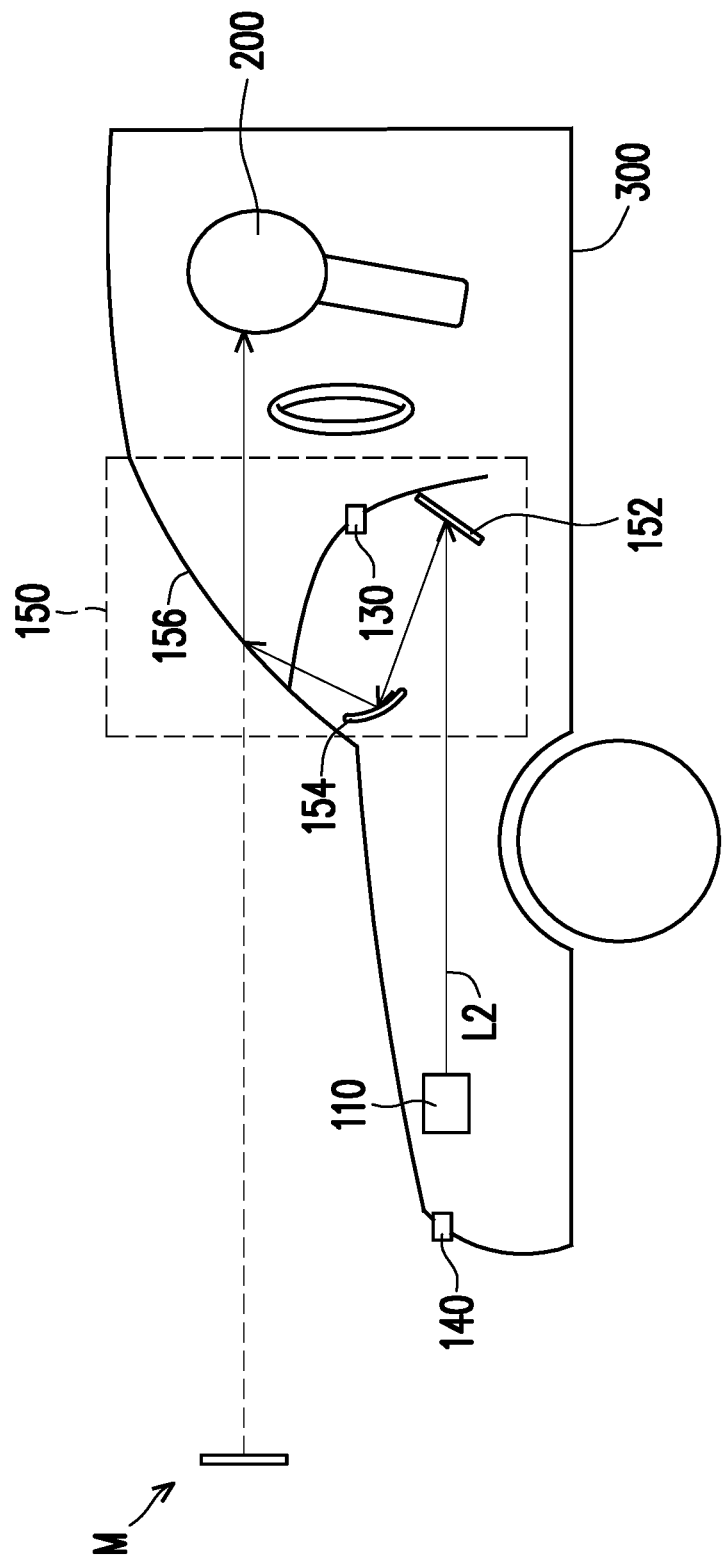
FIG. 2 is a schematic diagram of the optical system in the vehicle according to the embodiment in FIG. 1 disposed in a vehicle.

FIG. 1 is a block diagram of an optical system in a vehicle according to an embodiment of the disclosure. FIG. 2 is a schematic diagram of the optical system in the vehicle according to the embodiment in FIG. 1 disposed in a vehicle. Referring to FIG. 1 and FIG. 2, an optical system 100 in a vehicle of this embodiment is, for example, an augmented reality head up display (AR HUD) system, which is configured to project an image to a driver 200, so that the driver 200 integrates image information into an actual traffic condition through the optical system 100 in the vehicle, thereby enhancing the perception of a driving environment for the driver 200. The optical system 100 in the vehicle may also be other types of projection systems, and the disclosure is not limited thereto.

Specifically, the optical system 100 in the vehicle includes a display device 110, a processor 120, an internal sensor 130, an external sensor 140, and an optical lens assembly 150. The display device 110 is, for example, a picture generation unit (PGU), which is configured to generate the image information and output a light L2 having the image information to the optical lens assembly 150. The display device 110 includes a display panel 112 and a plurality of light emitting units 114. The plurality of light emitting units 114 are configured to emit a light L1 to the display panel 112.

In this embodiment, the light emitting units 114 may be used as a light source for the display panel 112, and may provide the light source to the display panel 112. For example, the display panel 112 may be a liquid crystal display panel, and the light emitting units 114 may be used as a backlight source 114A for the display panel 112. The display device 110 may be a liquid crystal display device. Therefore, the processor 120 may adjust a backlight thereof by controlling an operation of the display device 110 to achieve an image enhancement effect. However, the disclosure does not limit the type of the display device 110.

The light emitting unit 114 can include a light emitting diode chip or a light emitting diode package. For example, the light emitting unit 114 may be one or more light emitting diodes in series or in parallel, or one or more light emitting diode strings in series or in parallel. The light emitting diode may include, for example, an organic light emitting diode (OLED), a mini LED, a micro LED, a quantum dot (QD) light emitting diode (which may be, for example, QLED and QDLED), fluorescence, phosphor, or other suitable materials, which may be arranged and combined arbitrarily. However, the disclosure is not limited thereto.

In other embodiments, the display device may be a self-luminous display device, such as an organic light emitting diode display device, a mini LED display device, a micro LED display device, or a quantum dot (QD) light emitting diode (which may be, for example, QLED and QDLED) display device.

On the other hand, according to some embodiments, the processor 120 may receive a signal from a sensor, and adjust a light intensity according to the signal. Specifically, a light intensity of at least a portion of the light L1 emitted from the light emitting units 114 may be adjusted. The sensor may be the internal sensor 130, the external sensor 140, or a combination thereof. The signal may be an environmental signal (S2), a moving object detection signal (S3), a bio-sensing signal (S1), or a combination thereof. For example, the internal sensor 130 is configured to sense information of the driver 200 and output the bio-sensing signal S1 including physiological information of the driver 200 to the processor 120. The physiological information includes a sight-line position or physiological condition of the driver 200. For example, it may determine a direction of the driver's sight line, or whether the driver focuses on driving or is in drowsy driving. However, the disclosure is not limited thereto. The external sensor 140 is configured to sense environmental information and output the environmental signal S2 and/or the moving object detection signal S3 to the processor 120. The environmental information includes an ambient light intensity. For example, a driving time is during the day or at night. However, the disclosure is not limited thereto. The environmental information may also include whether there is a moving object around a vehicle 300 when driving, such as a pedestrian, an animal, information about other vehicles, or information about the vehicle 300 being driven. In addition, the optical lens assembly 150 may include a lens, a mirror, or a combination thereof. The optical lens assembly 150 may include at least one mirror or a plurality of mirrors. The mirrors included in the optical lens assembly 150 may be the same or different. The mirror may be a reflecting mirror, a flat mirror, a convex mirror, a concave mirror, an aspheric mirror, or a combination thereof, which may be selected and used according to requirements.

Therefore, the processor 120 may receive signals S1, S2, and/or S3 from the internal sensor 130 and/or the external sensor 140 of the vehicle 300 and integrate the information provided by the internal sensor 130 and the external sensor 140. The display device 110 outputs the light L2 including the image information to the optical lens assembly 150. In addition, there may also be signal transmission between the optical lens assembly 150 and the processor 120. The light L2 is projected to the driver 200 through reflecting mirrors 152 and 154, and a windshield 156 of the vehicle 300. Therefore, a virtual image M may be imaged in front of the driver 200, and therefore, the image information included therein may be integrated into the actual traffic condition to enhance the perception of the driving environment for the driver 200.

In some embodiments, the display device 110 may include an optical layer (not shown). The optical layer may be disposed between the backlight source 114A and the display panel 112. The optical layer may be disposed in the display panel 112. The optical layer mentioned above may include a single layer or include a plurality of layers. The plurality of layers in the optical layer may be the same or different. The disclosure is not limited thereto. The optical layer may include a polarizer, a wire grid polarizer, a heat dissipation layer, a reflecting layer, a lens layer, a diffusion layer, a phase difference layer, a prism sheet, or a combination thereof. According to some embodiments, the optical layer (such as the prism sheet) may be disposed on the backlight source 114A, and between the backlight source 114A and the display panel 112. A light emitting surface SA of the display panel 112 may be parallel to the optical layer (such as the prism sheet) disposed on the backlight source 114A. Alternatively, the light emitting surface SA of the display device 110 may not be parallel to the prism sheet and have an included angle.

In some embodiments, before the display device 110 outputs the light L2 to the optical lens assembly 150, the image information included therein may be corrected first.

In some embodiments, the backlight source 114A may include a light modulation element, which may adjust the light intensity or direction of the light emitting unit 114.

In some embodiments, the display panel 112 may include an adjustable cover plate, and the cover plate may be opaque or translucent to adjust an area of a light emitting area.

In this embodiment, the processor 120 may determine an emphasized portion of an object according to the received signals S1, S2, and S3, and enable the display device 110 to display an image corresponding to the emphasized portion by adjusting the light intensity of the at least a portion of the light L1 emitted from the light emitting units 114. In some embodiments, the object may be an arrow, a warning, or various patterns of a driving assistance information, such as a driving assistance graphical user interface (GUI). In some embodiments, the object may also be an ambient object, such as a pedestrian, an animal, a vehicle, or a building. The disclosure does not limit the type of the object. In some embodiments, the emphasized portion may be an edge portion of the object, a central portion of the object, or a combination thereof. According to some embodiments, adjusting the light intensity of the at least a portion of the light emitted from the light emitting units may be to turn off at least one light emitting unit, decrease the light intensity of the at least one light emitting unit, or increase the light intensity of the at least one light emitting unit.

FIG. 3A to FIG. 7B respectively illustrate various embodiments of how to adjust the light intensity of the light emitting unit under different conditions.

Figure 3A:
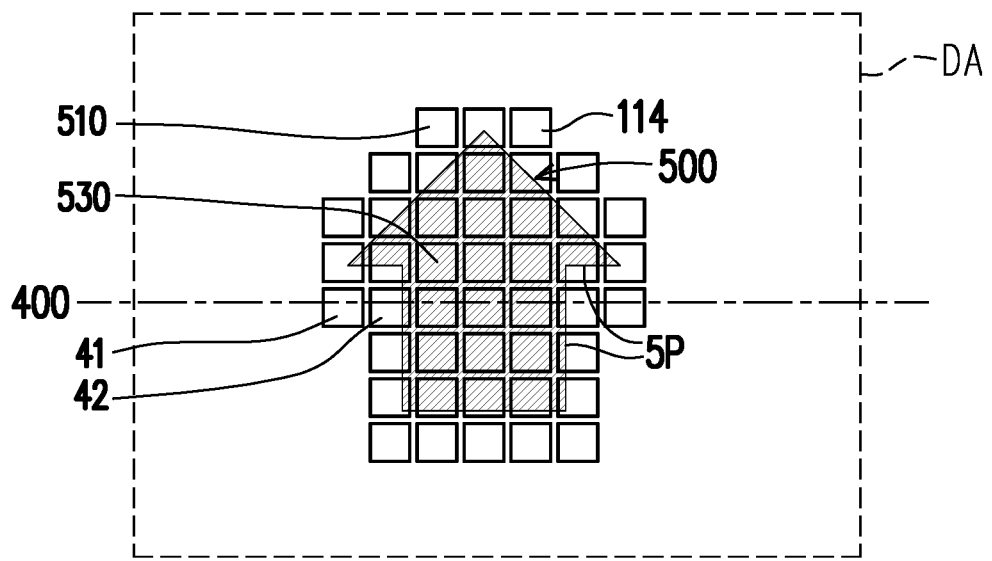
FIG. 3A is a schematic diagram of a display area according to an embodiment of the disclosure.
Figure 3B:
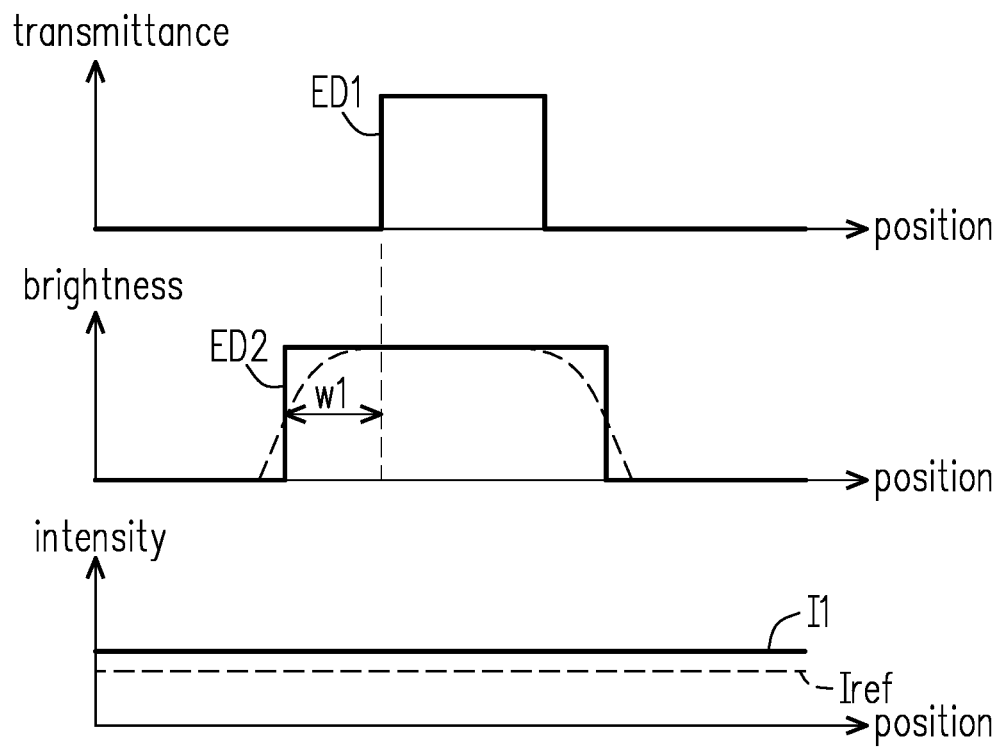
FIG. 3B is a schematic diagram of waveforms of various optical parameters of the display area on a base line according to the embodiment in FIG. 3A.

FIG. 3A is a schematic diagram of a display area according to an embodiment of the disclosure. FIG. 3B is a schematic diagram of waveforms of various optical parameters of the display area on a base line 400 according to the embodiment in FIG. 3A. From top to bottom, a schematic diagram of a waveform of a transmittance of the display panel 112, a schematic diagram of a waveform of a brightness of the backlight source 114A, and a schematic diagram of a waveform of an ambient light intensity are shown in sequence. The ambient light intensity may be detected by the external sensor 140, but the disclosure is not limited thereto. The base line 400 may be a horizontal line. In FIG. 3B, in the schematic diagram of the waveform of the brightness of the backlight source 114A, a dotted line is a waveform in a real situation. For ease of description, hereinafter, the waveform of the brightness of the backlight source 114A is denoted by a solid-line square waveform. In FIG. 3B, before a light intensity of the light emitting unit 114 is adjusted, a width w1 denotes a distance between an edge ED2 of the waveform of the brightness of the backlight source 114A and an edge ED1 of the waveform of the transmittance of the display panel 112 on the base line 400. A measurement position of the width w1 may be at a position of a half-height width of the waveform. In an embodiment, the width w1 is 0<w1<10 millimeters (mm).

Referring to FIG. 3A and FIG. 3B, a display area DA in FIG. 3A is, for example, a partial area on the windshield 156. In this embodiment, the driving assistance graphical user interface is taken as an exemplary embodiment of an object 500. The driving assistance GUI in the figure is, for example, the arrow. In this embodiment, since an ambient light intensity I1 sensed by the external sensor 140 is greater than a preset reference value Iref, it indicates that the driving environment at this time is relatively bright, such as during the day or when the sky is bright. The pixel units of the display panel 112 at a position corresponding to the object 500 maintains a high transmittance, and the light emitting units 114 of the backlight source 114A at a position corresponding to the object 500 maintains a high brightness. The reference value Iref may be determined according to a detection of an environment inside the vehicle and/or outside the vehicle.

Referring to FIG. 3A and FIG. 3B, in the display area DA, a contour of the object 500 is marked as 5P. An edge portion of the object 500 is marked as 510, and a central portion of the object 500 is marked as 530. In detail, in the display area DA, the edge portion 510 of the object 500 includes a first portion 41 and a second portion 42 through which the base line 400 passes. In this embodiment, the light emitting unit 114 corresponding to the first portion 41 and the light emitting unit 114 corresponding to the second portion 42 are turned on.

Figure 4A:
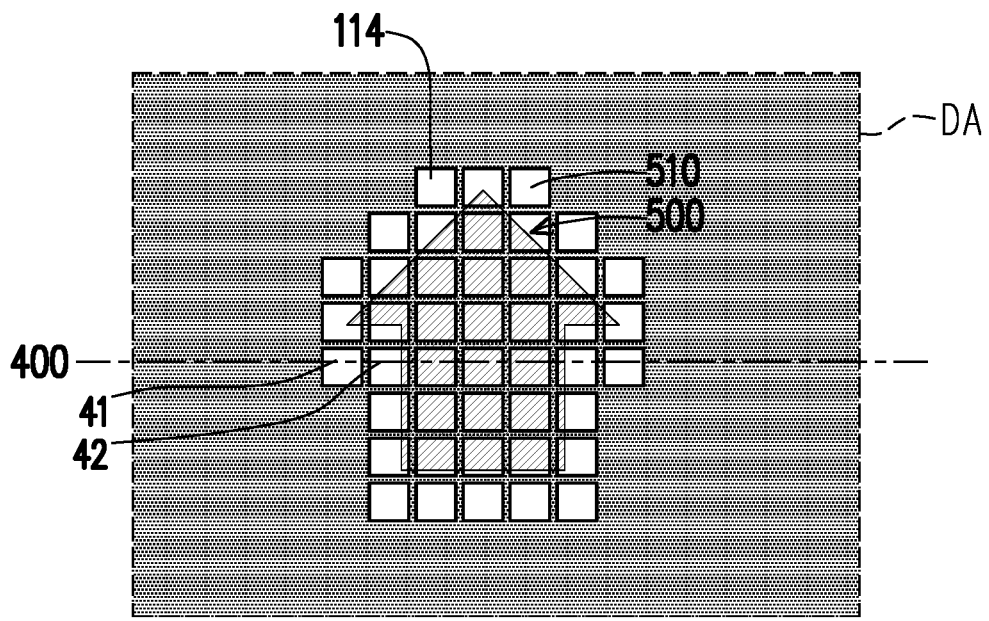
FIG. 4A is a schematic diagram of a display area according to an embodiment of the disclosure.
Figure 4B:
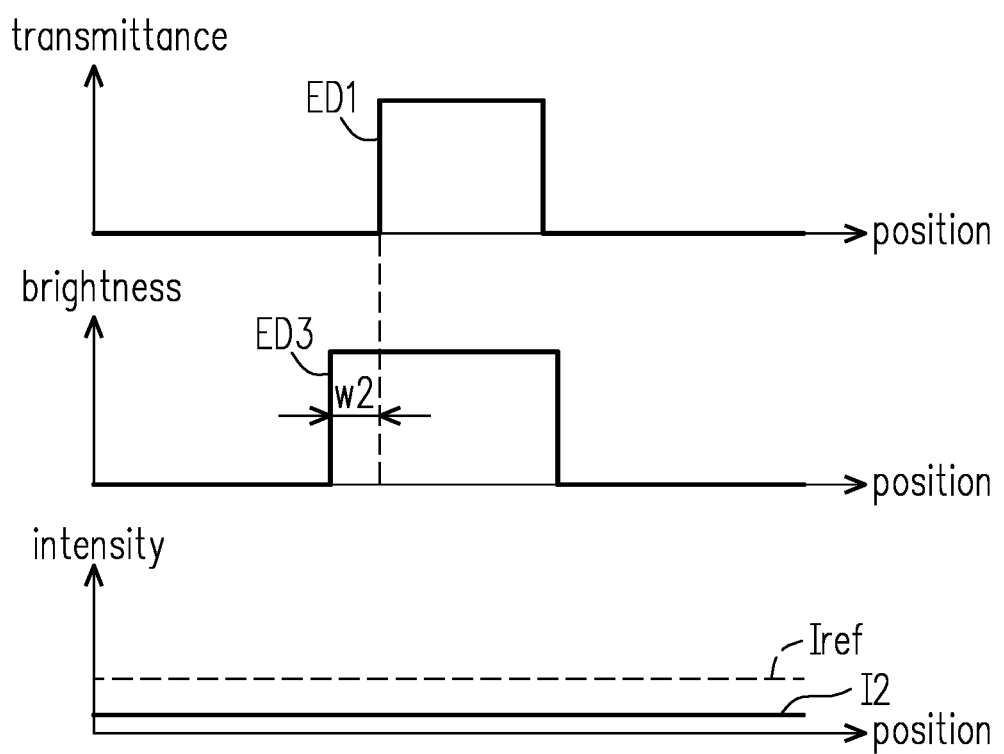
FIG. 4B is a schematic diagram of waveforms of various optical parameters of the display area on a base line according to the embodiment in FIG. 4A.

FIG. 4A is a schematic diagram of a display area according to an embodiment of the disclosure. FIG. 4B is a schematic diagram of waveforms of various optical parameters of the display area on the base line 400 according to the embodiment in FIG. 4A. From top to bottom, the schematic diagram of the waveform of the transmittance of the display panel 112, the schematic diagram of the waveform of the brightness of the backlight source 114A, and the schematic diagram of the waveform of the ambient light intensity are shown in sequence. The ambient light intensity may be detected by the external sensor 140, but the disclosure is not limited thereto. In FIG. 4B, after the light intensity of the light emitting unit 114 is adjusted, a width w2 denotes a distance between an edge ED3 of the waveform of the brightness of the backlight source 114A and the edge ED1 of the waveform of the transmittance of the display panel 112 on the base line 400. A measurement position of the width w2 may be at the position of the half-height width of the waveform Referring to FIG. 4A and FIG. 4B, the display area DA in FIG. 4A is, for example, the partial area on the windshield 156. In this embodiment, since an ambient light intensity I2 sensed by the external sensor 140 is less than the preset reference value Iref, it indicates that the driving environment at this time is relatively dark, such as at night or when the sky is relatively dark. On the edge portion of the object 500 serving as the driving assistance information, the brightness (light intensity) may be decreased or the corresponding light emitting units may be turned off to improve a light leakage. Therefore, in this embodiment, the brightness of the backlight source 114A corresponding to the edge portion 510 of the object 500 is adjusted to emphasize the difference from other portions.

For example, the processor 120 determines an emphasized portion of the object 500 to be the edge portion 510 according to an ambient light provided by the external sensor 140. Next, for example, the processor 120 controls the display device 110 to turn off the light emitting unit 114 corresponding to the edge portion 510, so that the display device 110 displays the image corresponding to the emphasized portion. In this embodiment, w2 is less than w1, which indicates that the light emitting unit 114 corresponding to the edge portion 510 is turned off, and w2 is greater than 0, which indicates that on the base line 400, a waveform width of the light emitting unit having the high brightness is wider than a waveform width of the pixel unit having the high transmittance. In an embodiment, w2 may also be less than or equal to 0, which indicates that on the base line 400, the waveform width of the light emitting unit having the high brightness may be equal to or narrower than the waveform width of the pixel unit having the high transmittance.

Referring to FIG. 4A and FIG. 4B, in detail, in the display area DA, the edge portion 510 of the object 500 includes the first portion 41 and the second portion 42 through which the base line 400 passes. In this embodiment, the light emitting unit 114 corresponding to the first portion 41 may be turned off, and the light emitting unit 114 corresponding to the second portion 42 may be turned on. As for in FIG. 3A and FIG. 3B, the light emitting unit 114 corresponding to the first portion 41 and the light emitting unit 114 corresponding to the second portion 42 are both turned on.

Figure 5A:
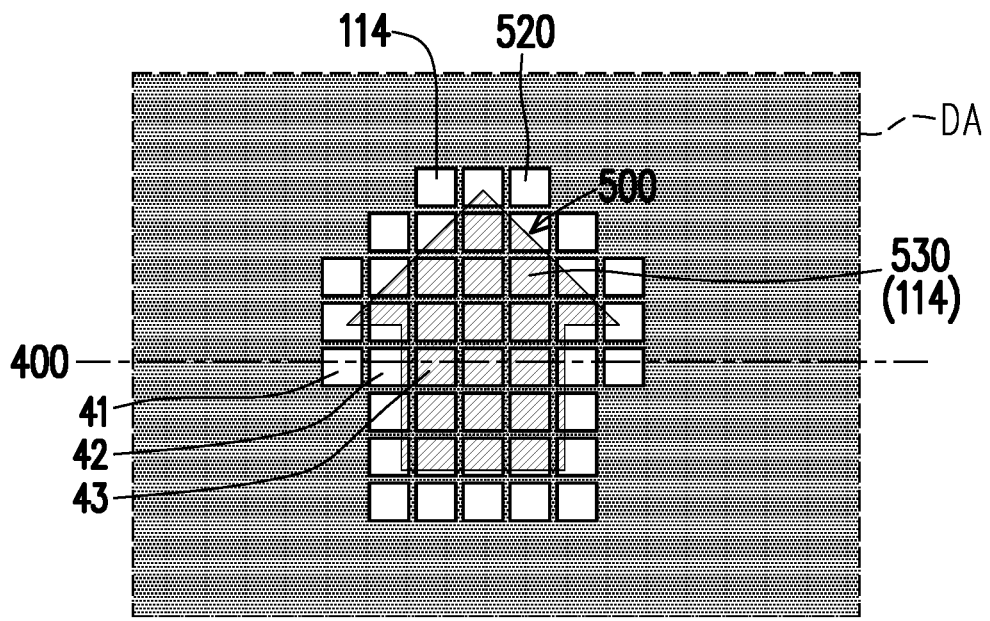
FIG. 5A is a schematic diagram of a display area according to an embodiment of the disclosure.
Figure 5B:
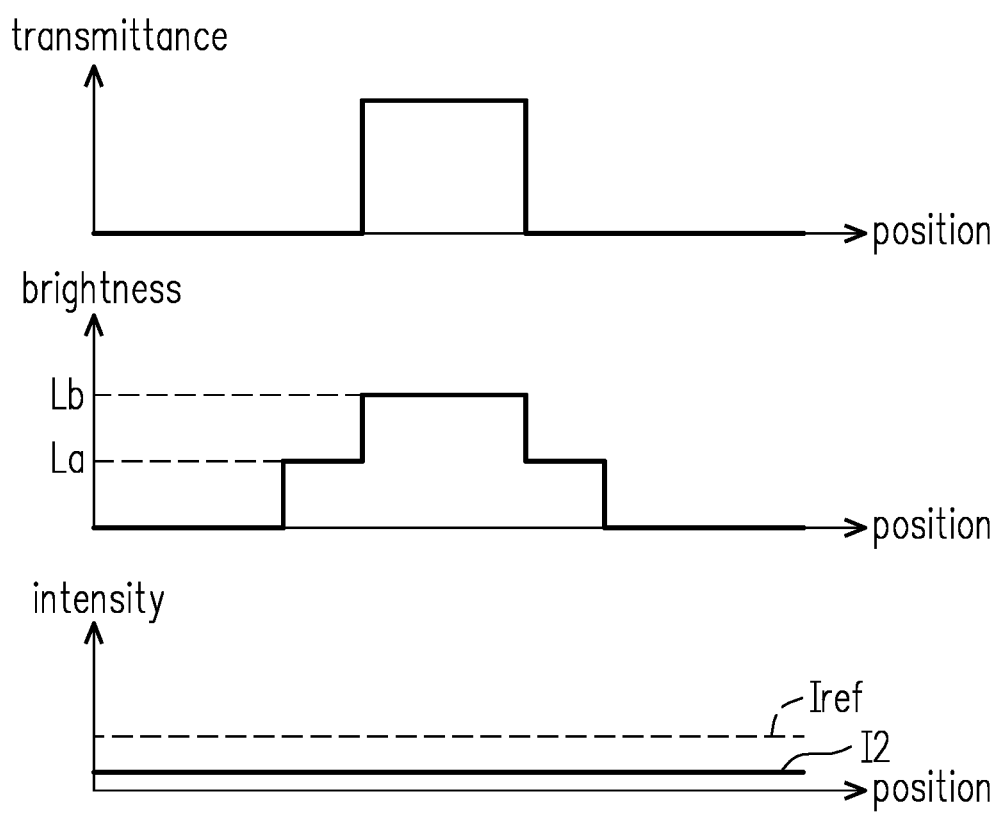
FIG. 5B is a schematic diagram of waveforms of various optical parameters of the display area on a base line according to the embodiment in FIG. 5A.

FIG. 5A is a schematic diagram of a display area according to an embodiment of the disclosure. FIG. 5B is a schematic diagram of waveforms of various optical parameters of the display area on the base line 400 according to the embodiment in FIG. 5A. From top to bottom, the schematic diagram of the waveform of the transmittance of the display panel 112, the schematic diagram of the waveform of the brightness of the backlight source 114A, and the schematic diagram of the waveform of the ambient light intensity are shown in sequence.

Referring to FIG. 5A and FIG. 5B, the display area DA in FIG. 5A is, for example, the partial area on the windshield 156. In this embodiment, since the ambient light intensity 12 sensed by the external sensor 140 is less than the preset reference value Iref, it indicates that the driving environment at this time is relatively dark, such as at night or when the sky is relatively dark. On the edge portion of the object 500, the brightness (light intensity) may be decreased or the corresponding light emitting units may be turned off to improve the light leakage. Therefore, in this embodiment, the brightness of the backlight source 114A corresponding to an edge portion 520 of the object 500 may be adjusted to emphasize the difference from other portions.

For example, the processor 120 determines the emphasized portion of the object 500 to be the edge portion 520 according to the ambient light provided by the external sensor 140. Next, for example, the processor 120 controls the display device 110 to decrease the light intensity of the at least a portion of the light L1 emitted from the light emitting unit 114 corresponding to the edge portion 520, so that the display device 110 displays the image corresponding to the emphasized portion. For example, the brightness of the light emitting unit 114 corresponding to the edge portion 520, originally with a high brightness Lb, is adjusted to a low brightness La. In this embodiment, on the base line 400, a waveform width of the light emitting unit 114 having the high brightness Lb may be equal to the waveform width of the pixel unit having the high transmittance. In this embodiment, a ratio of the low brightness La to the high brightness Lb is, for example, 0<La/Lb<0.9, but the disclosure is not limited thereto. Therefore, in this example, the emphasized portion of the object 500 is the edge portion 520.

Referring to FIG. 5A and FIG. 5B, in detail, in the display area DA, the edge portion 520 of the object 500 includes the first portion 41 and the second portion 42 through which the base line 400 passes. The central portion 530 of the object 500 includes a third portion 43 through which the base line 400 passes. In this embodiment, the light emitting unit 114 corresponding to the first portion 41 and the light emitting unit 114 corresponding to the second portion 42 may be turned on, and the light intensities may be decreased. The light emitting unit 114 corresponding to the third portion 43 (the central portion) may be turned on. The light intensity of the light emitting unit 114 corresponding to the third portion 43 (the central portion) may be higher than the light intensities of the light emitting unit 114 corresponding to the first portion 41 and the light emitting unit 114 corresponding to the second portion 42.

From another point of view, if the original brightness of the light emitting unit 114 is the low brightness La, the processor 120 determines the emphasized portion of the object 500 to be the central portion 530 according to the ambient light detected by the external sensor 140. Next, the processor 120 controls the display device 110 to increase the light intensity of the at least a portion of the light L1 emitted from the light emitting unit 114 corresponding to the central portion 530, so that the display device 110 displays the image corresponding to the emphasized portion. For example, the brightness of the light emitting unit 114 corresponding to the central portion 530, originally with the low brightness La, is adjusted to the high brightness Lb. Therefore, in this example, the emphasized portion of the object 500 is the central portion 530.

Figure 6A:
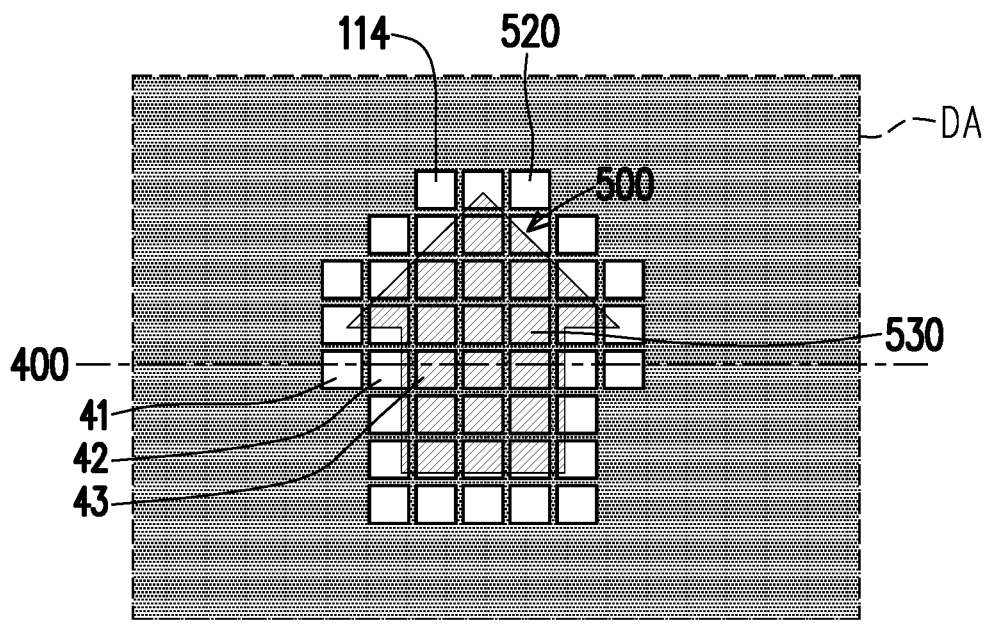
FIG. 6A is a schematic diagram of a display area according to an embodiment of the disclosure.
Figure 6B:
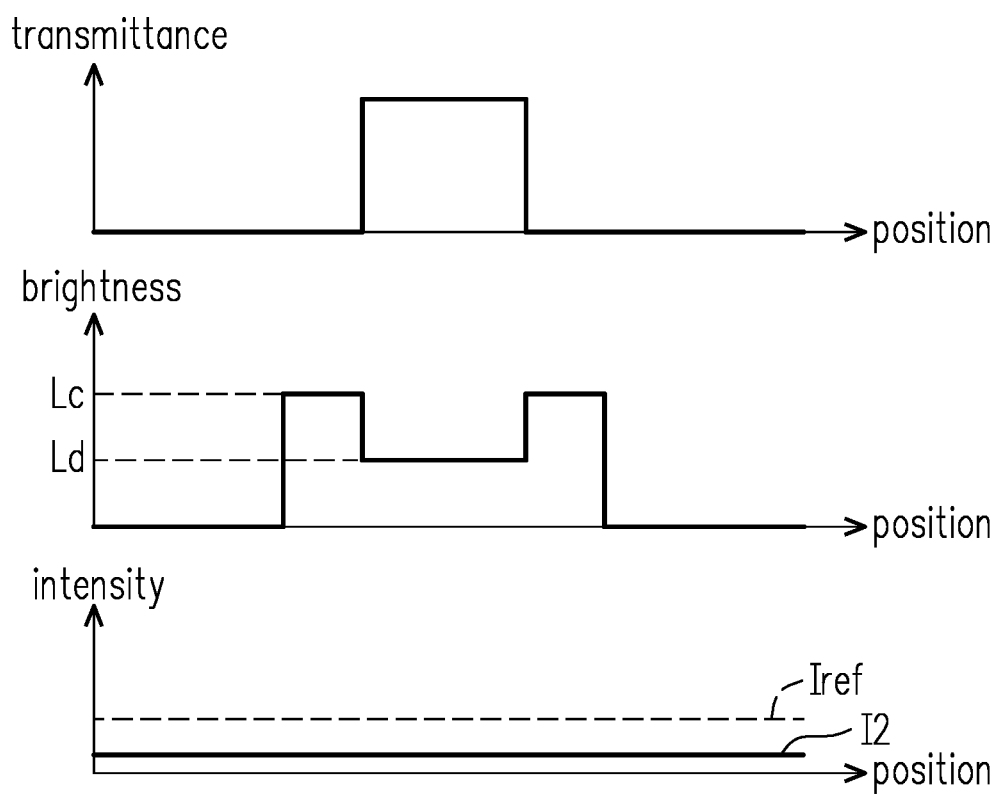
FIG. 6B is a schematic diagram of waveforms of various optical parameters of the display area on a base line according to the embodiment in FIG. 6A.

FIG. 6A is a schematic diagram of a display area according to an embodiment of the disclosure. FIG. 6B is a schematic diagram of waveforms of various optical parameters of the display area on the base line 400 according to the embodiment in FIG. 6A. From top to bottom, the schematic diagram of the waveform of the transmittance of the display panel 112, the schematic diagram of the waveform of the brightness of the backlight source 114A, and the schematic diagram of the waveform of the ambient light intensity are shown in sequence.

Referring to FIG. 6A and FIG. 6B, the display area DA in FIG. 6A is, for example, the partial area on the windshield 156. In this embodiment, since the ambient light intensity 12 sensed by the external sensor 140 is less than the preset reference value Iref, it indicates that the driving environment at this time is relatively dark, such as at night or when the sky is relatively dark. On the edge portion of the object 500, the brightness in a light emitting area of the backlight source 114A may be increased to emphasize the difference from other portions. Therefore, in this embodiment, the brightness of the backlight source 114A corresponding to the edge portion of the object 500 may be adjusted.

For example, the processor 120 determines the emphasized portion of the object 500 to be the edge portion 520 according to the ambient light provided by the external sensor 140. Next, for example, the processor 120 controls the display device 110 to enhance the light intensity of the at least a portion of the light L1 emitted from the light emitting unit 114 corresponding to the edge portion 520, so that the display device 110 displays the image corresponding to the emphasized portion. For example, the brightness of the light emitting unit 114 corresponding to the edge portion 520, originally with a low brightness Ld, is adjusted to a high brightness Lc. In this embodiment, on the base line 400, the waveform width of the light emitting unit 114 having the low brightness Ld may be equal to the waveform width of the pixel unit having the high transmittance. In this embodiment, a ratio of the low brightness Ld to the high brightness Lc is, for example, 0<Ld/Lc<0.9, but the disclosure is not limited thereto.

Referring to FIG. 6A and FIG. 6B, in detail, in the display area DA, the edge portion 520 of the object 500 includes the first portion 41 and the second portion 42 through which the base line 400 passes. The central portion 530 of the object 500 includes the third portion 43 through which the base line 400 passes. In this embodiment, the light emitting unit 114 corresponding to the first portion 41 and the light emitting unit 114 corresponding to the second portion 42 may be turned on, and the light intensities may be enhanced. The light emitting unit 114 corresponding to the third portion 43 (the central portion) may be turned on. The light intensity of the light emitting unit 114 corresponding to the third portion 43 (the central portion) may be lower than the light intensities of the light emitting unit 114 corresponding to the first portion 41 and the light emitting unit 114 corresponding to the second portion 42.

From another point of view, if the original brightness of the light emitting unit 114 is the high brightness Lc, the processor 120 determines the emphasized portion of the object 500 to be the central portion 530 according to the ambient light detected by the external sensor 140. Next, the processor 120 controls the display device 110 to decrease the light intensity of the at least a portion of the light L1 emitted from the light emitting unit 114 corresponding to the central portion 530, so that the display device 110 displays the image corresponding to the emphasized portion. For example, the brightness of the light emitting unit 114 corresponding to the central portion 530, originally with the high brightness Lc, is adjusted to the low brightness Ld.

In the embodiment of FIG. 6A and FIG. 6B, an object image in the display area DA displayed on the windshield 156 is the arrow as an example, but the disclosure is not limited thereto. In an embodiment, the object image in the display area DA displayed on the windshield 156 may also be an obstruction such as a pedestrian, an animal, or a vehicle, and a contour portion thereof may be enhanced by adjusting the light intensity mentioned above to emphasize the difference from other portions of the displayed information or actual traffic conditions.

Figure 7A:
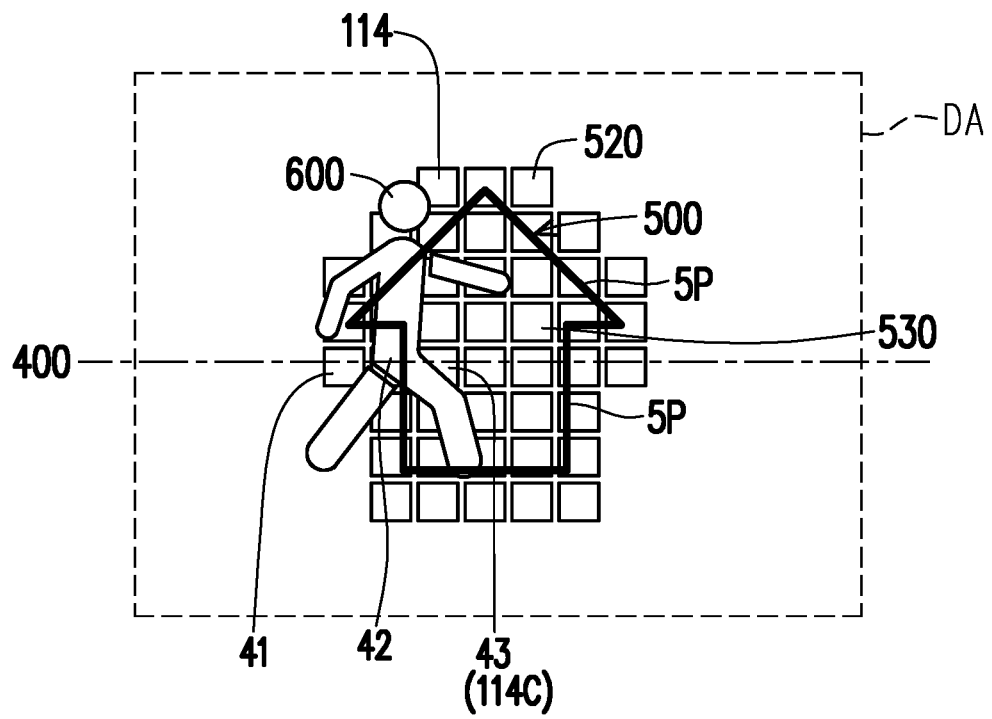
FIG. 7A is a schematic diagram of a display area according to an embodiment of the disclosure.
Figure 7B:
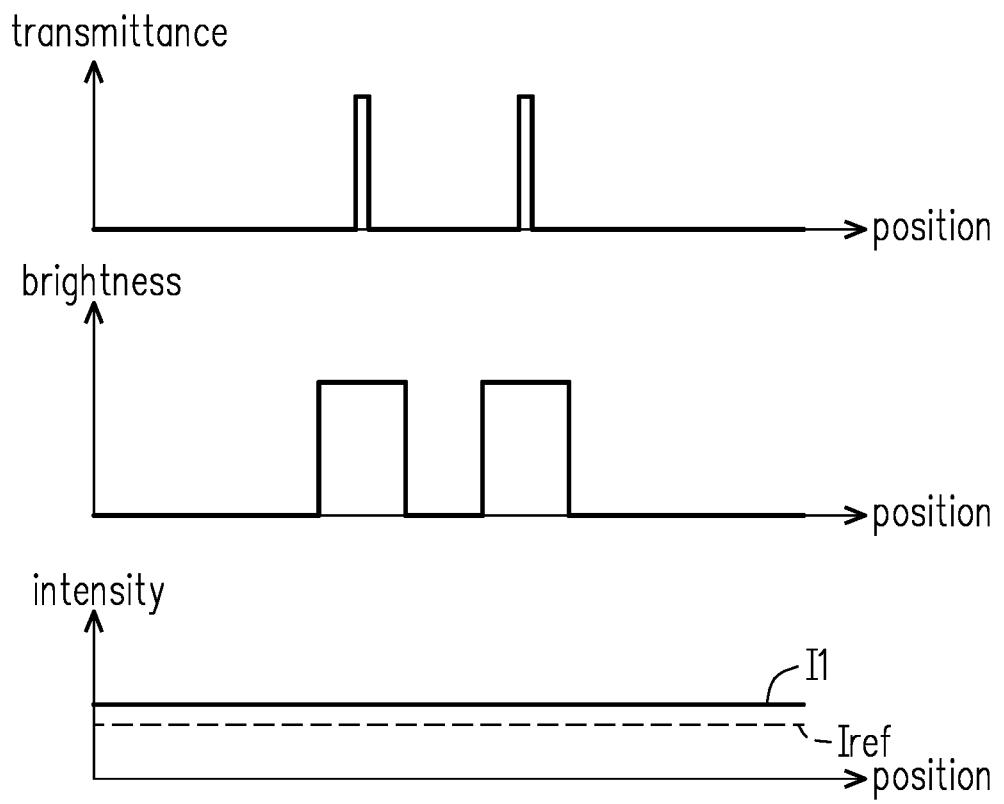
FIG. 7B is a schematic diagram of waveforms of various optical parameters of the display area on a base line according to the embodiment in FIG. 7A.

FIG. 7A is a schematic diagram of a display area according to an embodiment of the disclosure. FIG. 7B is a schematic diagram of waveforms of various optical parameters of the display area on the base line 400 according to the embodiment in FIG. 7A. From top to bottom, the schematic diagram of the waveform of the transmittance of the display panel 112, the schematic diagram of the waveform of the brightness of the backlight source 114A, and the schematic diagram of the waveform of the ambient light intensity are shown in sequence.

Referring to FIG. 7A and FIG. 7B, the display area DA in FIG. 7A is, for example, the partial area on the windshield 156. In this embodiment, since the ambient light intensity I1 sensed by the external sensor 140 is greater than the preset reference value Iref, it indicates that the driving environment at this time is relatively bright, such as during the day or when the sky is relatively bright. At the same time, an ambient object 600 such as the pedestrian appears in front of the vehicle. When the driving assistance information (the object 500) is superimposed on the ambient object 600, the displayed image and the backlight source 114A may be adjusted to prevent the image from obscuring the ambient object 600. Therefore, in this embodiment, the brightness of the backlight source 114A corresponding to the edge portion 520 of the object 500 may be adjusted to emphasize the difference from other portions. The edge portion 520 may include a contour 5P (denoted by a thick black line in the figure) of the object. Specifically, the brightness of the backlight source 114A corresponding to the contour 5P of the edge portion 520 of the object 500 may be adjusted to emphasize the contour of the object.

For example, the object 500 may be adjusted to an object having the central portion that is opaque. Therefore, only a contour line of the arrow is displayed in the display area DA. The transmittance of the display panel 112 maintains the high transmittance at a position corresponding to the contour line, and the rest of portions have the low transmittance. In detail, the light emitting units includes a central light emitting unit 114C, which corresponds to the central portion 530 of the object 500. According to some embodiments, the transmittance of the display panel 112 corresponding to the central portion 530 of the object 500 is adjusted. For example, the transmittance is reduced, or the transmittance is adjusted to zero. Furthermore, a light intensity of the central light emitting unit 114C may be adjusted. For example, the light intensity of the central light emitting unit 114C is decreased. Or, according to an embodiment, the light intensity of the central light emitting unit 114C is adjusted to 0, that is, the central light emitting unit 114C is turned off.

The processor 120 determines the emphasized portion of the object 500 to be the edge portion 520 according to the moving object detection signal S3 provided by the external sensor 140. Next, the processor 120 controls the display device 110 to increase the light intensity of the at least a portion of the light L1 emitted from the light emitting unit 114 corresponding to the edge portion 520, so that the display device 110 displays the image corresponding to the emphasized portion. For example, the brightness of the light emitting units 114 corresponding to the contour 5P of the edge portion 520 is adjusted to the high brightness. Therefore, in this example, the emphasized portion may be the edge portion 520 of the object 500, such as the contour 5P of the edge portion 520, and the brightness of the light emitting units 114 corresponding to the contour 5P of the edge portion 520 is increased. Therefore, when the driving assistance information is superimposed on the ambient object, the image and the backlight source may be adjusted to prevent the image from obscuring the ambient object.

Referring to FIG. 7A and FIG. 7B, in detail, in the display area DA, the edge portion 520 of the object 500 includes the first portion 41 and the second portion 42 through which the base line 400 passes. The central portion 530 of the object 500 includes the third portion 43 through which the base line 400 passes. The light emitting unit 114 corresponding to the first portion 41 and the light emitting unit 114 corresponding to the third portion 43 (including the central portion 530) may be turned off. In this embodiment, the second portion 42 corresponds to the contour 5P of the object 500, and the light emitting unit 114 corresponding to the second portion 42 may be turned on. In some embodiments, the light emitting unit 114 corresponding to the object 500 other than the contour 5P may be turned off, or the light intensity is decreased. Furthermore, the display panel 112 corresponding to the second portion 42 of the object 500 may maintain the normal or high transmittance, and the transmittance of the display panel 112 corresponding to the central portion 530 of the object 500 may be adjusted to zero. In this way, in the image displayed by the display device 110, the contour 5P of the object may be highlighted.

According to the embodiment of the disclosure, the processor may determine the emphasized portion of the object to be the edge portion or the central portion according to the ambient light or the ambient object. Therefore, when the driving time is at night or when the sky is relatively dark, on the edge portion of the driving assistance information, the corresponding brightness may be decreased or turned off to improve the light leakage. In addition, when the driving assistance information is superimposed on the ambient object, the displayed image and the backlight source may be adjusted to prevent the image from obscuring the ambient object. Therefore, the optical system in the vehicle according to the embodiment of the disclosure may adjust the object image according to the change in the environment, avoid the light leakage and obscuration to the ambient object, enhance the driving safety, and provide good user experience.

Figure 8:
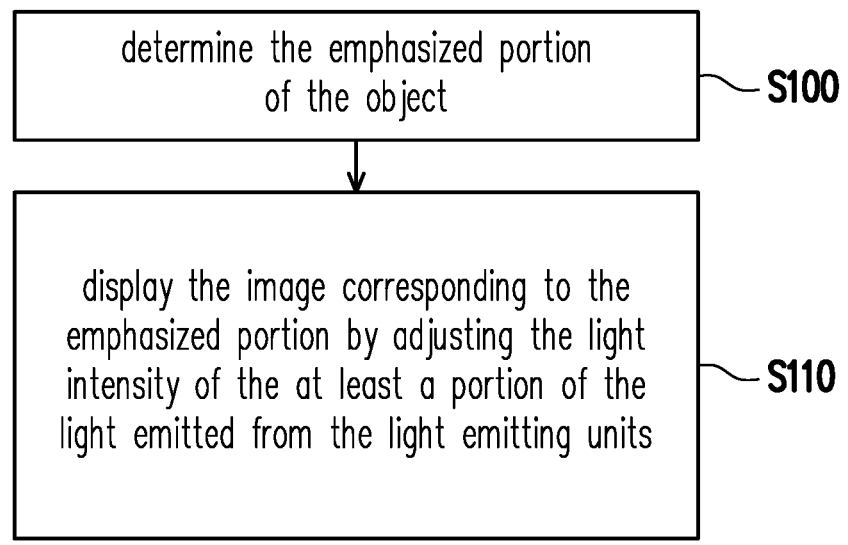
FIG. 8 is a flowchart illustrating steps in an operating method of an optical system in a vehicle according to an embodiment of the disclosure.

FIG. 8 is a flowchart illustrating steps in an operating method of an optical system in a vehicle according to an embodiment of the disclosure. Referring to FIG. 1, FIG. 2, and FIG. 8, the operating method of the optical system in the vehicle of this embodiment is at least applicable to the optical system 100 in the vehicle of FIG. 1 and FIG. 2. However, the disclosure is not limited thereto. Taking the optical system 100 in the vehicle of FIG. 1 and FIG. 2 as an example, in step S100, the processor 120 determines the emphasized portion of the object 500. In step S110, the processor 120 enables the display device 110 to display the image corresponding to the emphasized portion by adjusting the light intensity of the at least a portion of the light L1 emitted from the light emitting units 114.

In addition, sufficient teachings, suggestions, and embodiments concerning the optical system in the vehicle according to the embodiment of the disclosure may be gained from the above descriptions in the embodiments of FIG. 1 to FIG. 7.

Figure 9:
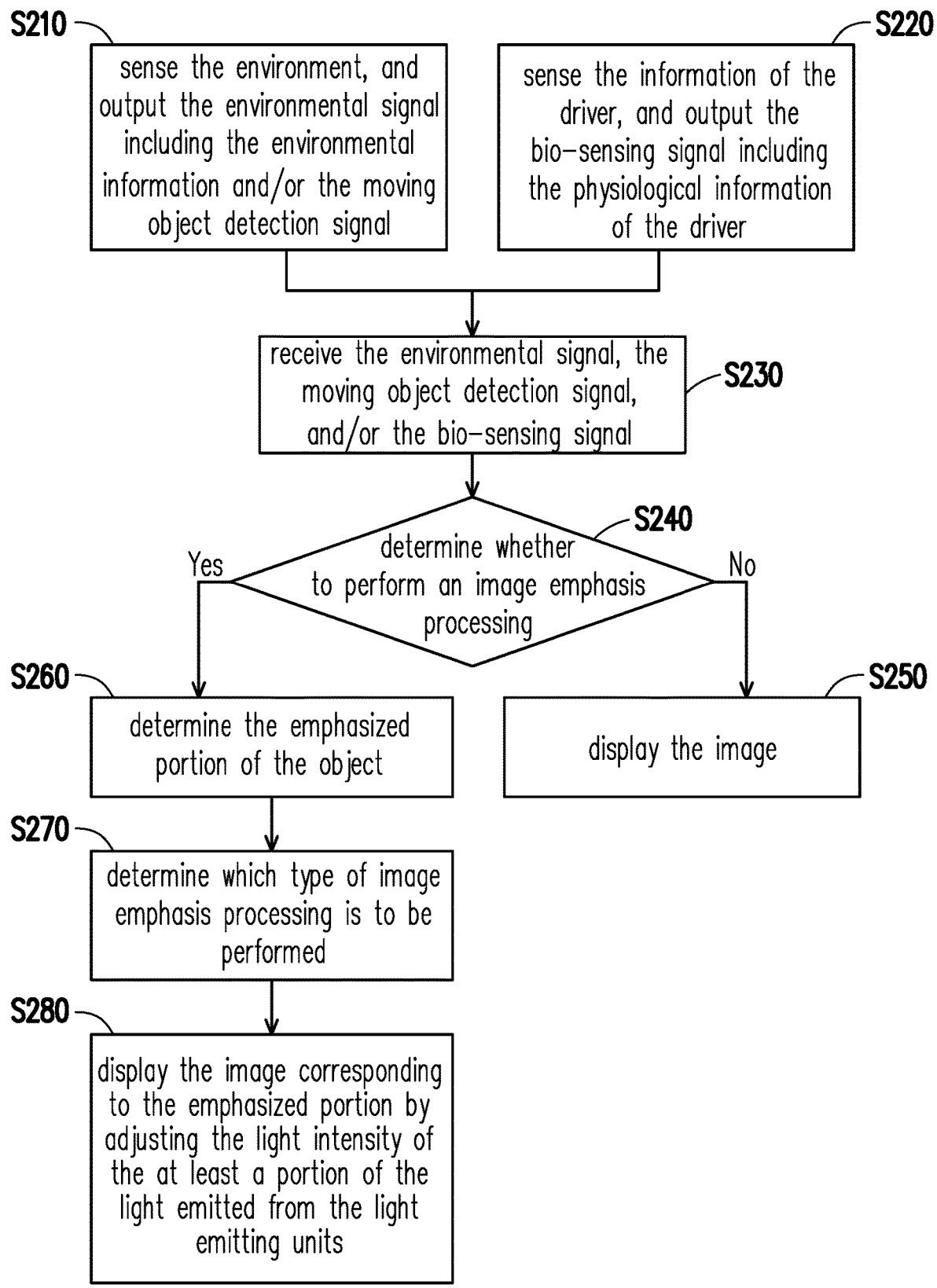
FIG. 9 is a flowchart illustrating steps in an operating method of an optical system in a vehicle according to another embodiment of the disclosure.

FIG. 9 is a flowchart illustrating steps in an operating method of an optical system in a vehicle according to another embodiment of the disclosure. Referring to FIG. 1, FIG. 2, and FIG. 9, the operating method of the optical system in the vehicle of this embodiment is at least applicable to the optical system 100 in the vehicle of FIG. 1 and FIG. 2. However, the disclosure is not limited thereto. Taking the optical system 100 in the vehicle of FIG. 1 and FIG. 2 as an example, in step S210, the external sensor 140 may sense the environment, and output the environmental signal S2 including the environmental information and/or the moving object detection signal S3 to the processor 120. In step S220, the internal sensor 130 may sense the information of the driver 200, and output the bio-sensing signal S1 including the physiological information of the driver 200 to the processor 120. In step S230, the processor 120 receives the signals S1, S2, and S3 from the internal sensor 130 and/or the external sensor 140 of the vehicle 300. In step S240, the processor 120 determines whether to perform an image emphasis processing.

In step S240, if the processor 120 determines that image emphasis processing is not required, in step S250, the display device 110 displays the image. In step S240, if the processor 120 determines that image emphasis processing is to be performed, in step S260, the processor 120 determines the emphasized portion of the object 500. Next, in step S270, the processor 120 determines which type of image emphasis processing in FIG. 4A, FIG. 5A, FIG. 6A, and FIG. 7A is to be performed. In the above embodiments, methods of the image emphasis processing in FIG. 4A, FIG. 5A, FIG. 6A, and FIG. 7A are only examples, and the operating method of the disclosure is not limited to the embodiments. In step S280, the processor 120 enables the display device 110 to display the image corresponding to the emphasized portion by adjusting the light intensity of the at least a portion of the light L1 emitted from the light emitting units 114.

In addition, sufficient teachings, suggestions, and embodiments concerning the operating method of the optical system in the vehicle according to the embodiment of the disclosure may be gained from the above descriptions in the embodiments of FIG. 1 to FIG. 8.

Based on the above, according to the embodiments of the disclosure, in the optical system in the vehicle, for the light emitting unit of the display device, the light intensity of the light emitting unit may be adjusted according to the information that is sensed. In this way, a better display effect of the object may be achieved, which may enhance the driving safety and provide the good user experience.

It is understood by those skilled in the art that various modifications and changes may be made to the structure of the disclosed embodiments without departing from the scope or spirit of the disclosure. In view of the above, it is hoped that the disclosure covers modifications and changes of the disclosure as long as the modifications and changes fall within the scope of the appended claims and equivalents thereof.

What is claimed is:

1. An operating method of an optical system in a vehicle, wherein the optical system comprises a display device and a sensor, the display device comprises a display panel and a plurality of light emitting units, the plurality of light emitting units are configured to emit a first light to the display panel, the display panel is configured to output a second light having an image information to a windshield of the vehicle, and the operating method comprises:
    detecting an intensity of ambient light by the sensor;
    determining an emphasized portion of an object displayed on the windshield according to the intensity of the ambient light; and
    displaying an image corresponding to the emphasized portion by the display device by adjusting a light intensity of at least a portion of the light emitted from the plurality of light emitting units.

2. The operating method of the optical system in the vehicle according to claim 1, wherein the emphasized portion is an edge portion of the object.

3. The operating method of the optical system in the vehicle according to claim 1, wherein the emphasized portion is a central portion of the object.

4. The operating method of the optical system in the vehicle according to claim 1, wherein adjusting the light intensity of the at least a portion of the light comprises turning off at least one of the plurality of light emitting units.

5. The operating method of the optical system in the vehicle according to claim 1, wherein adjusting the light intensity of the at least a portion of the light comprises decreasing the light intensity of at least one of the plurality of light emitting units.

6. The operating method of the optical system in the vehicle according to claim 1, wherein adjusting the light intensity of the at least a portion of the light comprises increasing the light intensity of at least one of the plurality of light emitting units.

7. The operating method of the optical system in the vehicle according to claim 1, further comprising receiving a signal from the sensor, and adjusting the light intensity of the at least a portion of the light according to the signal.

8. The operating method of the optical system in the vehicle according to claim 7, wherein the signal is an environmental signal, a moving object detection signal, a bio-sensing signal, or a combination thereof.

9. The operating method of the optical system in the vehicle according to claim 1, wherein the object is a driving assistance graphical user interface.

10. The operating method of the optical system in the vehicle according to claim 1, wherein the plurality of light emitting units comprises a central light emitting unit corresponding to a central portion of the object, and the operating method comprises adjusting the light intensity of the central light emitting unit, and adjusting a transmittance of the display panel corresponding to the central portion of the object.

11. The operating method of the optical system in the vehicle according to claim 1, further comprising:
    adjusting the light intensity of the at least a portion of the light according to a signal received by a processor.

12. The operating method of the optical system in the vehicle according to claim 1, wherein the sensor is an external sensor.

* * * * *